United States Patent
Jördening

(10) Patent No.: US 6,422,620 B1
(45) Date of Patent: Jul. 23, 2002

(54) BOX HANDLING GRIP

(76) Inventor: Harold Gene Jördening, 62 Oak Grove Cove, Byhalia, MS (US) 38611

( * ) Notice: Subject to any disclaimer, the term of this patent is extended or adjusted under 35 U.S.C. 154(b) by 0 days.

(21) Appl. No.: 09/642,231

(22) Filed: Aug. 21, 2000

(51) Int. Cl.$^7$ ................................................ B65G 7/12
(52) U.S. Cl. ............................ 294/15; 294/25; 294/27.1
(58) Field of Search ............................... 294/15, 16, 25, 294/26, 27.1, 28, 31.1, 34, 61, 137; 16/406, 422, 425, 426; 224/218, 219, 267; 229/117.09, 117.19

(56) References Cited

U.S. PATENT DOCUMENTS

| | | | | |
|---|---|---|---|---|
| 1,203,339 A | * | 10/1916 | Holstein | ....................... 294/16 |
| 1,274,481 A | * | 8/1918 | West | ........................ 294/25 X |
| 1,479,711 A | * | 1/1924 | Haarberg | ..................... 294/15 |
| 2,116,928 A | * | 5/1938 | Hanneman | .................. 294/27.1 |
| 2,206,314 A | | 7/1940 | Werner | |
| 2,602,688 A | * | 7/1952 | Brun | ....................... 294/27.1 X |
| 3,436,112 A | | 4/1969 | Pasquine | |
| 4,109,852 A | | 8/1978 | Monzain | |
| 4,226,349 A | | 10/1980 | Uccellini | |
| 4,707,011 A | | 11/1987 | McKim, Jr. | |
| 5,678,467 A | * | 10/1997 | Aigner | ...................... 294/15 X |
| 5,871,242 A | * | 2/1999 | Whitney | ....................... 294/16 |
| 6,082,794 A | * | 7/2000 | Whitney | ....................... 294/15 |

\* cited by examiner

*Primary Examiner*—Johnny D. Cherry

(57) ABSTRACT

An improved temporary hand held grip for engaging the edge of a cardboard, Styrofoam or wooden box that includes a right angle body to mate with the edge of a box and a plurality of teeth that penetrate a box contiguous to the edge of a box and just off side the edge. Each improved grip includes an attached leather strap connected to one angle side of the right angle body to aid in handling a box. The improvedgrip contains sufficient space to allow the fingers to grip the entire invention so as to prevent losing control of it when using it. The plurality of teeth are easily adjustable if it becomes necessary to adjust the depth of their penetration into the surface of the box being handled so as not to damage the contents of the box being handled while retaining a firm grip on the box. The improved grip also provides a means of preventing injuries from the sharp teeth by retracting when pressure is released when not being used tohandle a box.

10 Claims, 5 Drawing Sheets

BOX HANDLING GRIP

BACKGROUND—FIELD OF INVENTION

The present invention relates generally to the use of a singular portable detachable grip which provides a temporary detachable grip and handle to engage the edge of a cardboard, Styrofoam or wood box for the purpose of handling said boxes.

BACKGROUND—DESCRIPTION OF PRIOR ART

The majority of boxes or cartons supplied industry today are of cardboard. A few are of Styrofoam and of wood. Except for wood their surfaces are smooth and slick. Such surfaces make them difficult to grasp for handling, especially if relatively heavy and large enough so that they are cumbersome to lift, pick up off the floor or otherwise difficult to handle. Boxes come in a multitude of sizes. Larger ones are sometimes cumbersome for one person to handle them for moving them. Some have built in handles but these will break while others have slots in their sides which work fine till they get wet and then they fail. Boxes are not always in a convenient location to allow them to be easily handled. By providing an improved grip that is used on any edge of any box solves the problem of getting a secure grip on a box in almost any location for moving, thus solving the problems of breaking handles, slots failing, the chances of dropping a box or a person falling backwards thus causing an injury because of a poor grip. A known prior art is shown in U.S. Pat. No. 2,206,114 issued to Werner Jul. 2, 1940. It describes a permanent handle mounted in a container's side. The carton must be permanently punched so the handle can work. Secondly, it protrudes into the container. A second known prior art is shown in U.S. Pat. No. 4,226,349 issued to Ucellini Oct. 7, 1980. This device has several defects which are listed as follows:

1. The patent itself states that it is for "fibrous box such as cardboard" which restricts it's use to only such containers.
2. The device has projections that are on a flat plane for use in engaging the side walls of a box. To use it effectively it can only be used on a matching flat plane large enough to accept it.
3. The "abstract" of said patent describes the device as a "pair . . . of grips for engaging . . . the lateral sides of a box". However, in a fast paced work environment i.e. loading moving conveyers from carts or off loading moving conveyers into carts or on pallets or off-loading gravity chutes, and having to use a pair of grips would make them very inefficient and cumbersome to use.
4. The projections are fixed and can not be adjusted for any depth needed. Therefore, its use is further restricted to fibrous or possibly styrofoam containers.
5. The projections are fixed at an angle and in one direction. This further restricts how the device may be used. As shown in FIG. 3 of U.S. Pat. No. 4,226,314 the direction of use is in an upward direction. It may be presumed to be useable to move a box. However, the single direction of the projections makes it difficult to move a box where a box is under a shelf or in close proximity to another one.
6. Once the projections are bent and then bent back, the device loses its ability to function and after being bent back several times they will break off due to the constant bending.
7. They offer no protection to any person as there is no way for them to retract so any person who rubs against the projections may suffer an injury.

The present invention provides a hand held detachable grip for a carton or box which can be temporarily attached to any edge of a box for handling it. The present invention also provides a handle on one right angle side for lifting vertically when engaged with the edge of a box. With the present invention having spring loaded teeth, and after being forced into engaging the box, it will automatically retract with the release of pressure to a position that makes it safe for the user of the present invention. The teeth of the present invention also have a minor small adjustment as for changing their depth of penetration for the wall of the box being handled. In addition to cardboard and styrofoam, the present invention can also be used on wood.

SUMMARY

In accordance with the present invention a temporarily detachable grip comprises a rigid right angle piece of metal having a means of attaching to the edge of a box and having teeth with which to engage the wall of a box contiguous to the edge of a box for the purpose of handling said box with said teeth being fully retractable for safety purposes and with a means to adjust for the depth of penetration of the thickness of the wall of the box being handled as well as preventing damage to the contents of the box. The present invention also has a carrying handle for the purpose of maintaining control of the present invention while using it and which handle also provides a means for lifting a box vertically without slipping off the hand. A carrying strap hole is in one end to allow it to be carried on the person of the user with a carrying strap when not in use.

OBJECTS AND ADVANTAGES

Accordingly, several objects and advantages of the present invention are:
1. To provide a single grip that can be used in either the left or right hand equally well on any container made of cardboard, styrofoam or wood.
2. To provide a grip that can easily be used in a work environment that is either slow or fast paced.
3. To provide a grip having teeth that are adjustable for the depth of penetration needed in relation to the thickness or density of the box being handled.
4. To provide a grip with teeth that can retract so as to prevent serious injury to the user.
5. To provide a grip that will simultaneously support itself and the object being lifted, especially when lifting vertically.

Further objects and advantages of my invention will become apparent from a consideration of the drawings, their description and ensuing description.

BRIEF DESCRIPTION OF THE SEVERAL VIEWS OF THE DRAWINGS

The reference numbers refer to the same part in each figure.

DETAILED DESCRIPTION OF FIGS. 1–5

Figure 1:
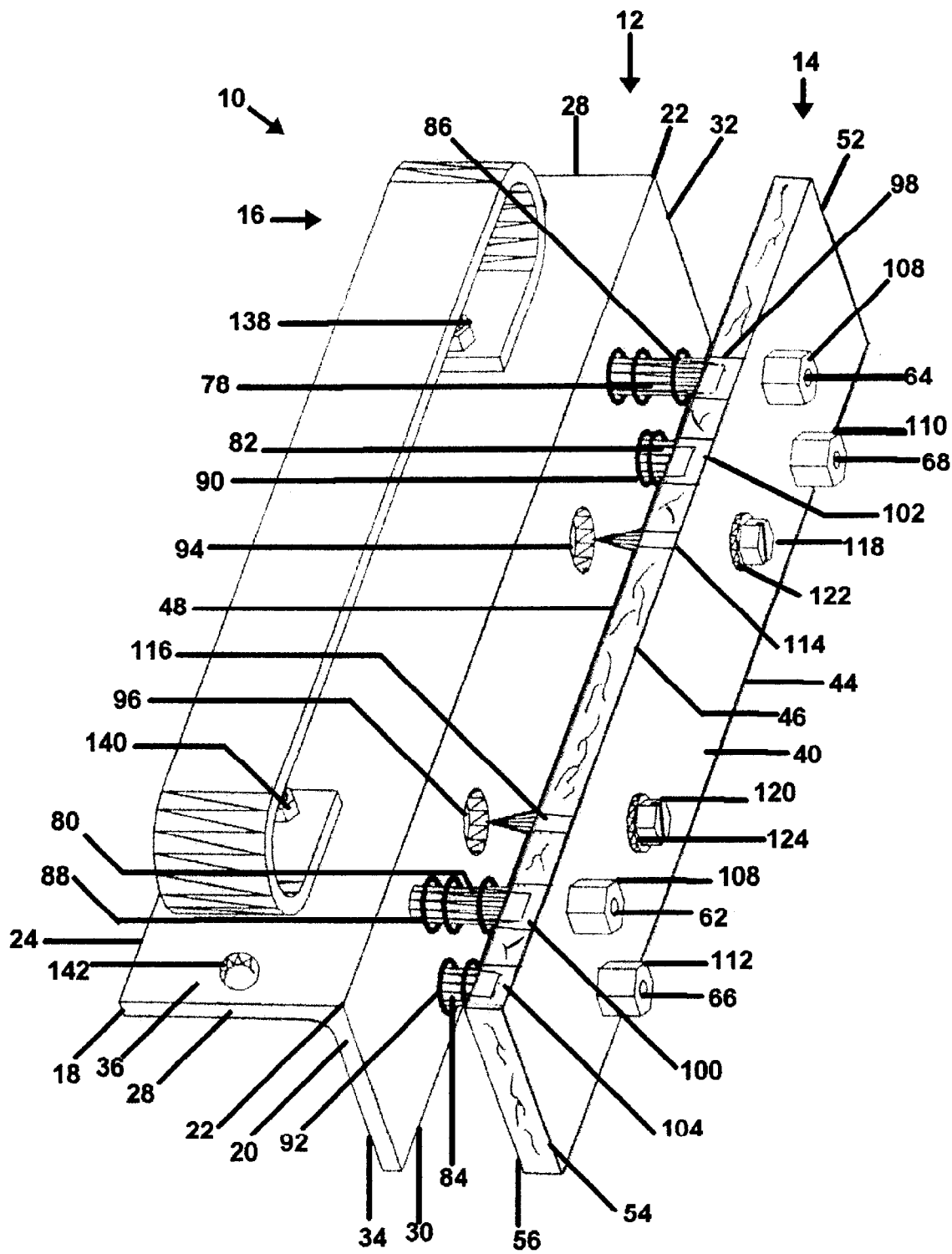
FIG. 1 shows a static external isometric view of the present invention.
Figure 2:
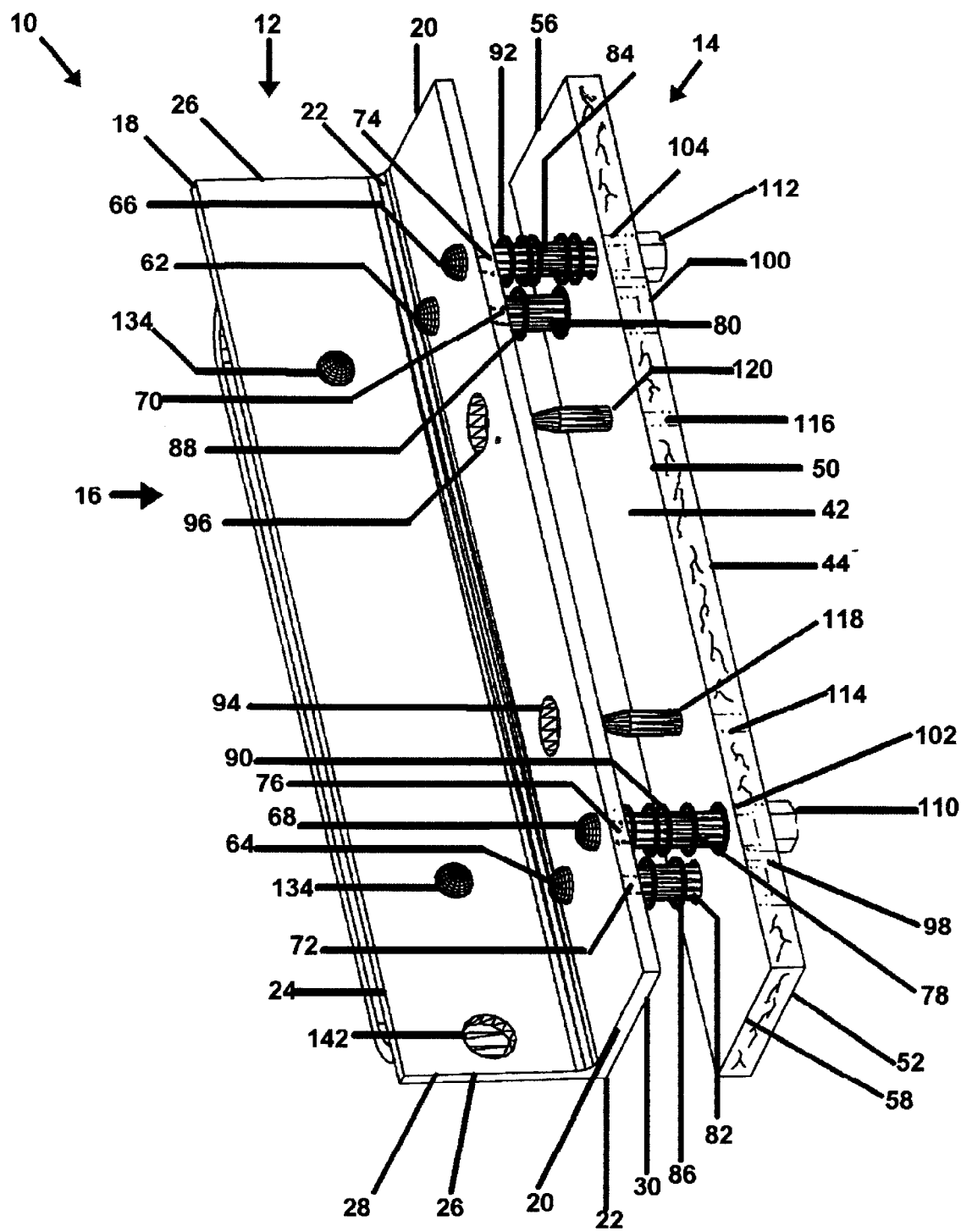
FIG. 2 shows a static internal isometric view of the present invention.
Figure 3:
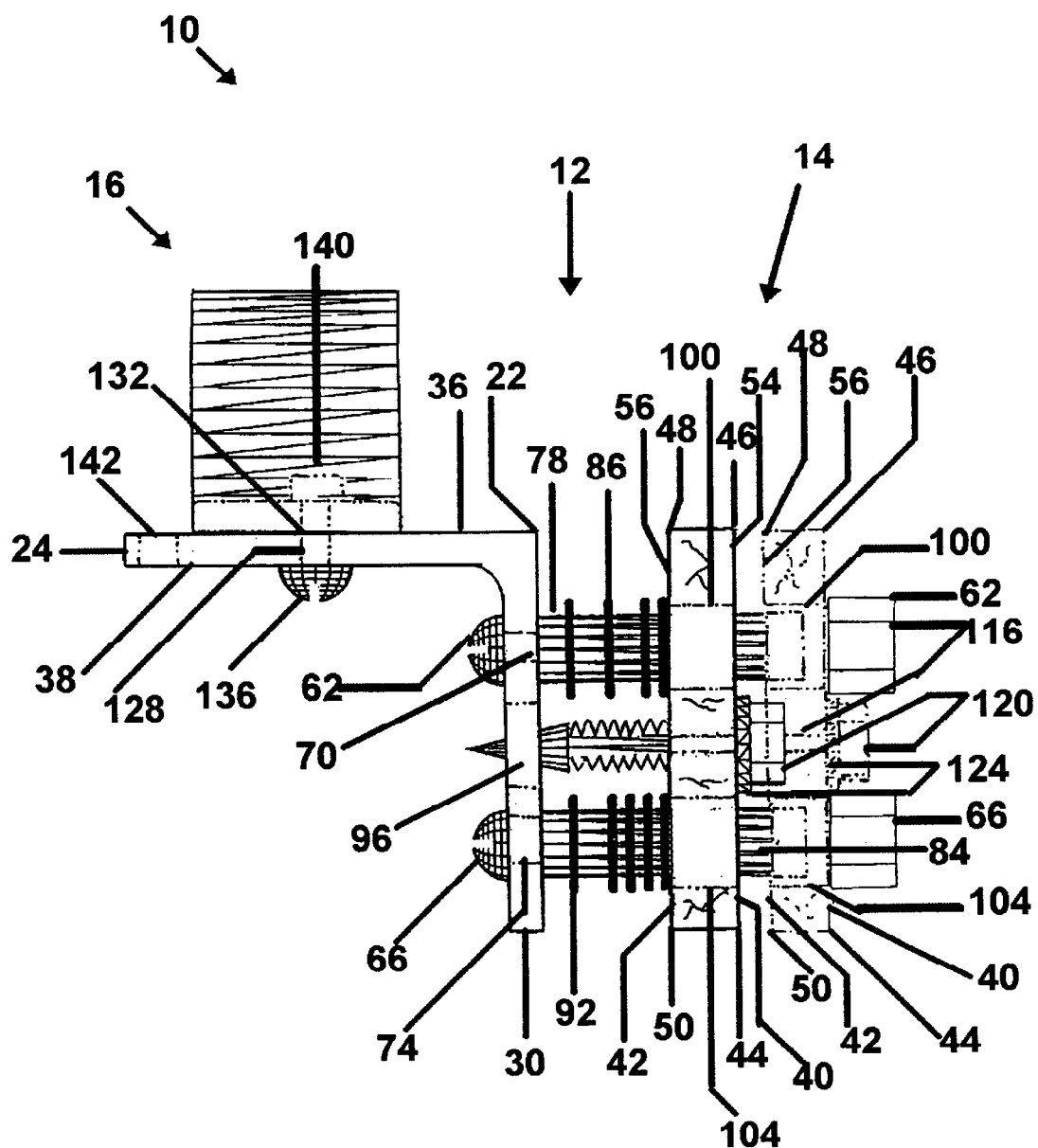
FIG. 3 shows a dynamic detailed view of the present invention showing the direction of movement of the pressure plate and how this movement compresses the compression springs and moves the pressure plate teeth through the main body assembly.
Figure 4:
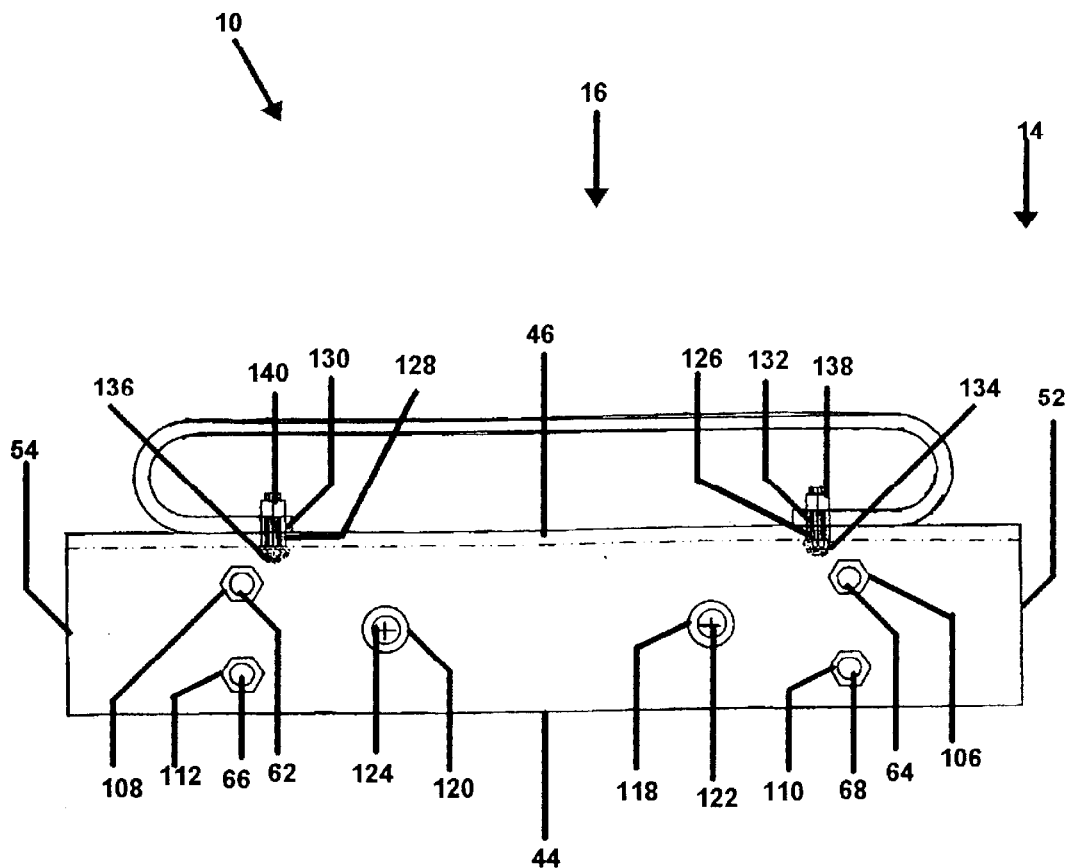
FIG. 4 shows the location of the holes for attaching the support handle assembly that are not shown in any other drawings.
Figure 5:
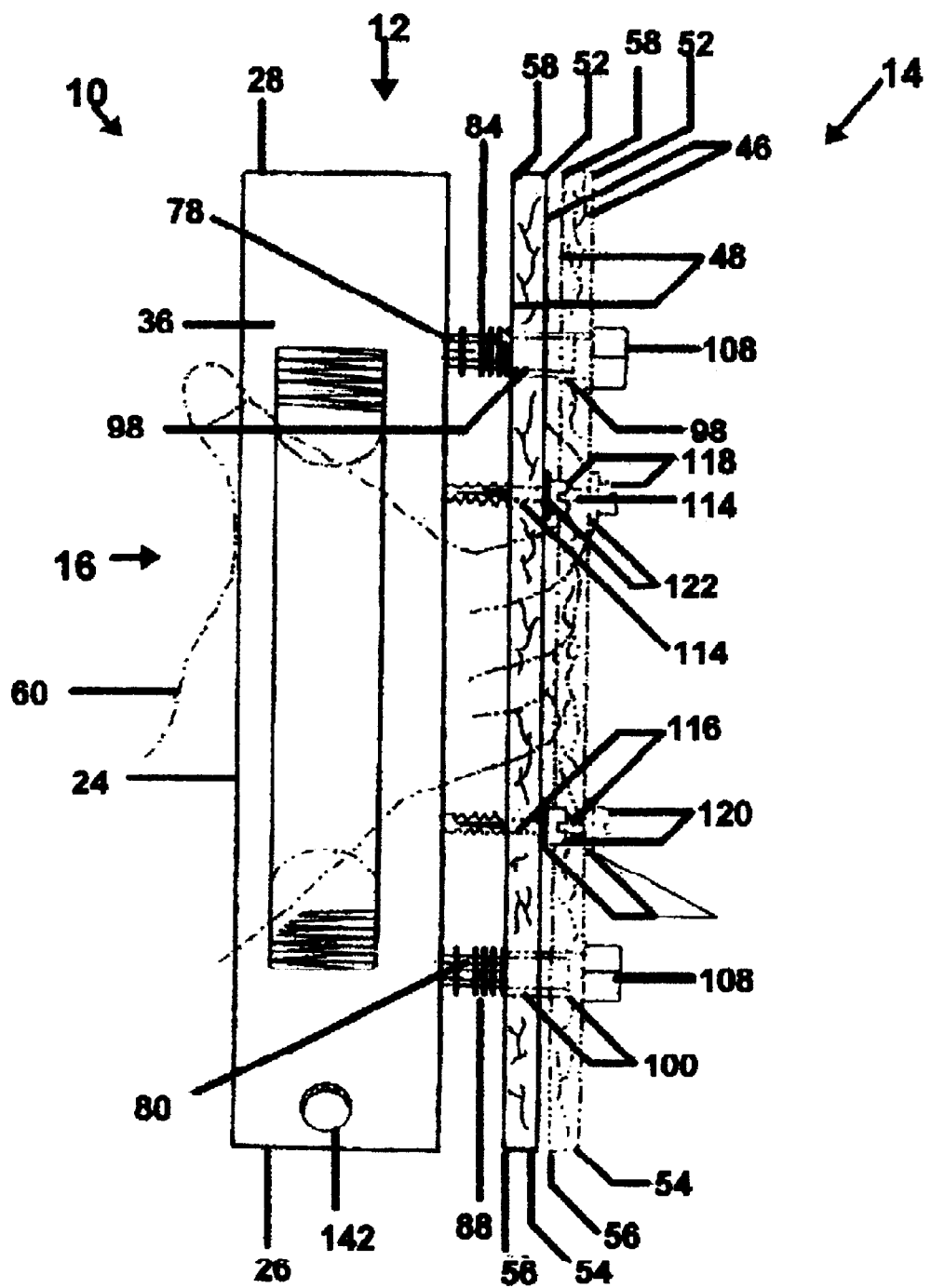
FIG. 5 shows how the hand extends through the support handle assembly in order to grasp the entire present invention.

Referring now to the drawings, the present invention is generally referred to as number 10. A typical embodiment of the present invention is illustrated in FIG. 1, an isometric exterior view, FIG. 2, an isometric interior view and in FIGS. 3 and 4 illustrating an end view in detail. With references to FIGS. 1 through 4 the present invention is shown as comprising three assemblies: main body assembly 12, pressure plate assembly 14, and support handle assembly 16. With respect to the preferred embodiment, main body assembly 12 is a single piece of metal having a rigid right angle form the entire length. Main body assembly 12 is typically 7.500 in. (190.5 mm) long and with a thickness throughout of approximately 0.125 in.(3.175 mm). Main body assembly 12, being a right angle, has horizontal leg 18, vertical leg 20 and heel 22. Each leg extends the entire length of main body assembly 12 with a width typically of 1.5 in. (38.100 mm). Horizontal leg 18 has longitudinal edge 24 with horizontal end edges 26 and 28. Vertical leg 20 has longitudinal edge 30, with vertical end edges 32 and 34. Main body assembly 12, being a right angle, has flat planar exterior surface 36 and flat planar interior surface 38. Said flat planar surfaces consists of the entire opposing flat planar surface areas of both horizontal leg 18 and vertical leg 20. Main body assembly 12, being a right angle, will mate with the right angle edge of a box for engaging said box. Main body assembly 12, without any component parts attached is the main part to which pressure plate assembly 14 and support handle assembly 16 are attached. Main body assembly 12 can be manufactured from any light weight material that can be drilled and tapped for a small machine screw (small bolts) and will neither bend nor fracture during use or due to seasonal temperatures where used. Said assembly has all corners rounded off to avoid snagging and personal injury. Aluminum is the preferred material. Pressure plate assembly 14 is a six sided rectangular part. It can be made of wood or any suitable material. Wood is the preferred material with oak wood being the preferred type of wood. Said assembly has pressure plate flat planar surfaces 40 and 42, pressure plate longitudinal edges 44, 46, 48, 50 and pressure plate end edges 52, 54, 56 and 58. Said assembly is typically 7.500 in. (190.500 mm) and long, 1.5 in. (25.4 mm) wide, typically having a minimum thickness throughout of 0.250 in (6.350 mm). All corners of said assembly are rounded off to avoid snagging and personal injury. It is essential that pressure plate assembly 14 have a minimum thickness throughout of approximately 0.250 in. (6.351 mm). This thickness of said assembly provides space for the fingers of a hand 60 to get a firm grip of the entire invention as illustrated in FIG. 5. Pressure plate assembly 14 is connected to main body assembly by four connecting bolts 62, 64, 66 and 68. Support handle assembly 16 is typically 8.500 in. (215.900 mm) long, 1.00 in. (25.4 mm) wide with a thickness throughout of approximately 0.187 in. (4.763 mm). Support handle assembly 16, when attached to main body assembly 12 allows the hand of the average person easily to go through it for gripping around the pressure plate assembly 14 as illustrated in FIG. 5. Support handle assembly 16 is the means whereby the present invention provides a temporary handle for handling an object and for lifting an object vertically by stopping the hand 60 from slipping off the end of the main body assembly 12 as illustrated in FIG. 5. It also keeps the entire assembly from accidently coming off the user's hand to cause damage or an injury. For making the present invention, the legs of main body assembly 12 can be used interchangeably for attaching either support handle assembly 16 or pressure plate assembly 14. It is a design function for having the perimeter dimensions of either leg of main body assembly 12 and pressure plate assembly 14 to be equal. This design function also allows the centers of all holes in main body assembly 12 and pressure plate assembly 14 to be aligned with respect to each other so that the present invention can be easily made, errors in manufacturing are reduced, and to function more efficiently. Depending on the leg used, a longitudinal edge with the corresponding end edges of main body assembly 12 must be used as a reference point for locating the centers of all holes drilled in said assembly. For connecting bolts 62–68, four connecting bolt holes 70, 72, 74, and 76 are drilled and tapped perpendicular to the exterior flat planar surface 36 of the leg used to attach pressure plate assembly 14. Connecting bolts 62–68 are typically a 8/32 N.C. machine screw with an overall length of 1.250 in. (31.750 mm). Two each of the four connecting bolt holes 70–76 are located near each end edge of the leg used. Using the same leg, the centers of one of each of the two said holes are located 1.250 in. (31.750 mm) from each end edge and 0.312 in (7.940 mm) from the longitudinal edge of the leg used. The centers of the two remaining said holes are located 1.250 in. (31.750 mm) from these same end edges and 1.125 in. (28.575 mm) from the same longitudinal edge. Connecting bolts 62–68 are tightly threaded from interior surface 38 toward the exterior surface 36 their entire length in connecting bolt holes 70–76 for attaching pressure plate assembly 14 to main body assembly 12. Over each connecting bolt 62–68 are guide sleeves 78, 80, 82 and 84. Said sleeve is a #8×0.750 in. (19.050 mm) long, having an outside diameter of 0.250 in. (6.350 mm) fitting loosely over connecting bolts 62–68. Said sleeve can be made of any metal or nonferrous material such as nylon. Over said sleeves and sandwiched between exterior flat planar surface 36 of the leg used and the flat planar surface 40 or 42 of pressure plate assembly 14 facing exterior side 36 are compression springs 86, 88, 90 and 92. Said spring is manufactured from 0.020 (0.508 mm) wire, typically music wire or any similar wire with the same characteristics and with an outside diameter of 0.365 in. (9.271 mm), a free length of 0.750 in. (19.050 mm) and a total of 5.5 coils and approximately 0.750 in. (19.050 mm) long. The necessity of having four connecting bolts 62–68 and their being spaced to allow the average hand to fit between them is so that no jamming will occur while urging pressure plate assembly 14 towards exterior surface 36 as pressure is applied to pressure plate assembly 14. In main body assembly 12, two main body assembly pressure plate teeth access holes 94 and 96 are drilled perpendicular to the flat planar surface of the leg used for attaching pressure plate assembly 14 with a diameter of 0.281 in. (7.137 mm). Said holes have their centers located 2.375 in. (60.325 mm) from the end edge and 0.500 in. (12.700 mm) from the longitudinal edge of the same leg used to attach pressure plate assembly 14. For locating the centers of all holes drilled in pressure plate assembly 14, it is necessary that a longitudinal edge and end edge of pressure plate assembly 14 be combined for said edges to be used as a reference point. It is essential that the ends of the longitudinal edge used meet with one end of the end edge used and be perpendicular to it for use as a reference point. It is further necessary that the same longitudinal edge and end edges be used as a reference point for the location of the centers of all holes drilled in pressure plate assembly 14. For attaching said assembly to main body assembly 12, four guide sleeve access holes 98, 100, 102 and 104 are drilled perpendicular to the pressure plate flat planar surface used with a diameter of 0.312 in (7.950 mm). Guide sleeve access holes 98–104 are located so that two of each of said four holes are located near each end edge used. The centers of one of each of the two guide access holes 96–104 are located 1.250 in. (31.750 mm) from each end edge and 0.312 in. (7.925 mm) from the longitudinal edge of the same flat planar surface, 40 or 42 that is used. The centers of the two remaining holes are located 1.250 in. (31.750 mm) from the end edge and 1.125 in (28.575 mm) from the same longitudinal edge. Guide sleeves 78–84 and compression springs 86–92 are each 0.750 in. (19.050 mm) long. With guide sleeves 78–84 and compression springs 86–92 slid over connecting bolts 62–68, said bolts extend approximately 0.312 in. (7.925 mm) past the erds of guide sleeves 78–84 and compression springs 86–92. Guide sleeve access holes 98–104 have an inside diameter of 0.313 in. (7.950 mm) which is 0.63 in (1.600 mm) larger than the 0.250 in. (6.38 mm) outside diameter of guide sleeves 78–84 This difference serves to allow guide sleeves 78–84 to freely through guide sleeve access holes 96–104, and to function as a guide for pressure plate assembly 14 when pressed the full extent of its travel towards exterior surface 36 of the leg used. In addition, guide sleeves 78–84 prevent pressure plate assembly 14 from snagging on the threads of connecting bolts 62–68. To attach pressure plate assembly 14 to main body assembly 12, pressure plate assembly 14 is pressed over connecting bolts 62–68 and guide sleeves 78–84. Said assembly is pressed over guide sleeves 78–84 far enough so that hex headed nuts 106, 108 110 and 112 (preferably nylon lock nuts) can be threaded on to connecting bolts 62–68 to attach pressure plate assembly 14 to main body assembly 12 securely. With hex headed nuts 106–112 threaded on connecting bolts 62–68, said bolts must not extend beyond the threaded end of said nuts. This is a safety feature that prevents injuries to the fingers from the ends of connecting bolts 62–68 that could occur if extended beyond the threaded end of hex headed nuts 106–112 when gripping pressure plate assembly 14 as illustrated in FIG. 5. With pressure plate assembly 14 attached to main body assembly 12, guide sleeves 78–84 will enter and remain approximately 0.125 in. (3.175 mm) inside guide sleeve access holes 98–104. This prevents guide sleeves 78–84 from becoming dislodged as pressure plate assembly 14 is urged towards exterior flat planar side 36. If dislodged, they would prevent said assembly from being pressed toward exterior surface 36. Compression springs 86–92 with an outside diameter of 0.365 in. (9.271 mm) are 0.115 in. (2.910 mm) larger than that of guide sleeve access holes 98–104. By being placed over guide sleeves 78–84 and having a larger diameter than guide sleeve access holes 98–104, said springs are kept sandwiched between exterior surface 36 and the flat planar surface 40 or 42 of pressure plate assembly 14 facing exterior surface 36. Compression springs 86–92, being sandwiched between exterior surface 36 and pressure plate assembly 14 when attached, are compressed approximately 0.125 in. (3.175 mm). This provides a constant force opposing the force directed against said springs. Said springs also force pressure plate assembly 14 and main body assembly 12 to remain separated approximately 0.623 in (15.875 mm). When pressure plate assembly 14 has traveled the maximum travel towards exterior surface 36, compression springs 86–92 will be fully compressed. Being fully compressed, said springs constantly oppose the force applied, forcing pressure plate assembly 14 to return to the original position when pressure is released. Hex headed nuts 106–112 can be screwed out one quarter to one half turn if necessary to make any small adjustment so the distance between exterior surface 36 and the flat planar surface 40 or 42 of pressure plate assembly 14 facing exterior surface 36 remains approximately 0.625 in. (15.875 mm) their entire length. The distance between guide sleeves 78–84 on connecting bolts 62–68 in pressure plate assembly 14 is such that there is sufficient room for a person's hand to fit between them. This permits the maximum use of pressure placed on pressure plate assembly 14 during use. Two pressure plate teeth access holes 114 and 116 with a diameter of 0.094 in. (2.388 mm) are drilled perpendicular to the flat planar surface, either 40 or 42, of pressure plate assembly 14 used for guide sleeve access holes 98–104. The centers of said holes are 2.375 in. (60.325 mm) from an end edge used and 0.500 in. (12.700 mm) from the longitudinal edge of pressure plate assembly 14 that is used. In said holes, two pressure plate teeth 118 and 120 are screwed their entire length. Pressure plate teeth 118 and 120 are #10×1 in. long metal to metal sharp pointed wafer screws. However, any similar type of metal to metal screws with similar type threads and length may be used. Pressure plate teeth 118 and 120, when threaded their entire length into pressure plate assembly 14, will have a remaining length on the opposing side of said assembly of approximately 0.625 in. (15.875 mm). It is the difference between the diameters of pressure plate teeth access holes 114 and 116 and pressure plate teeth 118 and 120 plus the large threads of said teeth that cause said teeth to bite into the wood of pressure plate assembly 14. This causes them to stay threaded in. The sharp points of pressure plate teeth 118 and 120 easily penetrate cardboard boxes, Styrofoam boxes and also wooden boxes which require such sharp points to penetrate them for moving them. The centers of main body assembly pressure plate access holes 110 and 112 are aligned with those of pressure plate teeth access holes 114 and 116. Thereby, no damage to pressure plate teeth 118 and 120 will occur as they pass through the centers of main body pressure plate access holes 110 and 112. Over each pressure plate tooth 118 and 120 is adjusting lock washer 122 and 124. Typically, only one lock washer is needed for each pressure plate tooth, 118 and 120. Said washer is for adjusting the depth of penetration of pressure plate teeth 118 and 120 according to the thickness of the object being handled with any adjustment being very minor. Adjusting lock washers 122 and 124 are a #10 metal lock washer; however, any similar type lock washer can be used. Adjustment of pressure plate teeth 118 and 120 is accomplished by screwing said teeth 118 and 120 out, removing or adding adjusting lock washers 122 and 124 and screwing pressure plate teeth 118 and 120 back into the pressure plate teeth access holes 114 and 116. If further adjustment is needed, pressure plate teeth 118 and 120 can also be screwed further out for a minor adjustment in their depth of penetration. Said washer on pressure plate teeth 118 and 120 allows depth of penetration to be either a greater or lesser depth into the wall of the object on which used. Due to the outward force of compression springs 86–92, pressure plate teeth 118 and 120 are prevented from extending through main body pressure plate access holes 110 and 112, This avoids any danger of injury from exposure to the sharp pointed teeth 118 and 120. Support handle assembly 16 is attached to the remaining leg as shown in FIG. 5. To attach support handle assembly 16, two main body support handle assembly holes 126 and 128 are drilled perpendicular to the flat planar surface of the leg used. The centers of said holes are located approximately 1.500 in (38.100 mm) from the end edge of the leg used and 0.750 in (19.500 mm) from the longitudinal edge of the same leg used. Said holes have a diameter of 0.187 in. (4.79 mm). In support handle assembly 16 two support handle bolt holes, 130 and 132, with an approximate diameter of 0.187 (4.79 mm) are punched, one at each end. The centers of said holes are approximately 0.500 in. (12.700 mm) from the end edge of the support handle assembly 16 and in the longitudinal center of said assembly. To attach support handle assembly 16, two support handle bolts 134 and 136 are inserted through main body support holes 126 and 128 and support handle holes 120 and 132 from the interior flat planar surface 38 toward the exterior flat planar surface 36 and secured with support bolt hex nuts 138 and 140 (preferably nylon lock nuts). Support handle bolts (small machine screws) 134 and 136 can range in size from 6/32 N.C. to 8/32 N.C. with an overall length of approximately 0.500 in. (12.700 mm). Support handle assembly 16 is attached with its ends facing each other. However, said handle can be attached with the ends facing in opposing direction to each other. Said support handle assembly 16 can be made from any material that is resilient, soft, non-irritating, flexible and maintains its form during use. Leather is the preferred material. Carrying strap hole 142 is designed for a carrying strap (not shown as it is not an essential part of the invention) and is drilled in the same leg used for support handle assembly 16. It is drilled approximately 0.125 in (3.175 mm) from the end edge in the longitudinal center of the leg used for said assembly 16 with a diameter of approximately 0.468 in (11.887 mm).

Operation

The manner of using the handy lift box grip to move, lift or carry a box is similar to a person using two hands to pick up a box. Specifically, one hand is placed under one end or in some other suitable position while the opposing hand is placed along the edge or in some other suitable position which will allow both hands to oppose each other in order to grip the box between them for moving, lifting or carrying the box. The basic right angle configuration of the main body assembly (12) allows it to mate with the right angle edges of a box. A hand (60) is placed through support handle assembly (16) as shown in FIG. 5 with the fingers reaching completely around the flat planar surface (40 or 42) of pressure plate assembly (14) to get a firm grip on one of pressure plate assembly's longitudinal edges (44–50) depending on which one is co-existent with the longitudinal edge of main body assembly 12 when completely assembled. It is the thickness of pressure plate assembly (14) that allows sufficient space for the fingers of the hand (60) to be able to grip the entire pressure plate assembly (14) and to maintain that grip when handling a box. The application of pressure on pressure plate assembly (14) will be relatively uniform over the entire said assembly (14) as pressure is applied by a hand over the entire area of pressure plate assembly (14) that is between the hex headed nuts (106–112) that are screwed onto the pressure plate connecting bolts (62–68) and pressure plate guide sleeves (78–84) located near each end of the pressure plate assembly. Compression springs (86–92) always remain sandwiched between the exterior side (36) and the flat planar surface (40 or 42) of pressure plate assembly (14). With pressure applied to pressure plate assembly (14), said pressure urges pressure plate assembly (14) to be forced over guide sleeves (78–84) towards main body assembly (12) and to ride over the guide sleeves (78–84). With guide sleeves (78–84) extending into the guide sleeve access holes (98–104) a short distance and secured in this position by the hex headed nuts (106–112) on connecting bolts (62–68), they will be prevented from becoming dislodged so as to prevent the pressure plate assembly from traveling towards exterior flat planar surface (36) as pressure is applied to pressure plate assembly (14). This permits the pressure plate assembly (14) to slide unobstructed towards the exterior flat planar surface (36) when pressure is applied to it. Compression springs (86–92) are wedged between the exterior side (36) and pressure plate assembly (14) due to their diameter being larger than guide sleeve access holes (98–104) and being fitted over guide sleeves (78–84). Therefore, as pressure is applied to pressure plate assembly (14), the pressure plate compression springs (86–92) compress to resist the pressure being applied so that when pressure is released on the pressure plate assembly (14), it will return to its original position. With pressure applied to pressure plate assembly (14), the two pressure plate teeth (118–120), secured in pressure plate assembly (14) by being forced through pressure plate teeth access holes (114–116), are forced towards the exterior flat planar surface (36) and through main body assembly pressure plate teeth access holes (110 and 112). When the compression springs (86–92) are completely compressed as shown in FIG. 3, the pressure plate teeth (118–120) will extend through main body pressure plate teeth access holes (114 and 116) approximately 0.125 in. (3.175 mm). Said teeth will extend far enough to penetrate the side wall of the box being lifted and with continued pressure on pressure plate assembly 14 will grip the box just off the right angle edge of the box contiguous to the edge of the box. Once the pressure plate teeth (118–120) have penetrated the box being handled and the opposing hand is in a position to aid in lifting the box, it is easily gripped simultaneously by each hand as they work together in a gripping type action. With one hand having a secure grip on one side and the other having a secure grip with the handy lift box grip which will not slip due to the pressure plate teeth (118–120) having penetrated the side wall of the box contiguous to the edge of the box being handled, the box is easily handled. With the pressure being kept on the pressure plate assembly (14) and the remaining hand also in a lifting position, usually under the box being lifted, from which it also will not slip, each hand compliments each other in a gripping type action to lift the box. This makes it possible to easily handle a box with less effort than with out the use of the present invention.

What I claim as my invention is:

1. A hand held detachable grip for engaging the flat wall of a fibrous, Styrofoam, or wood box contiguous to the edge of the box comprising a. a rigid right angle formed member of predetermined dimensions having a flat planar surfaced horizontal and vertical leg defining an exterior and interior substantially flat planar surface over a majority of area of said right angle members whereby an interior surface formed by said right angle defines means for engaging the corresponding right angle edge of a box, b. said right angle vertical leg having plurality of connecting bolt holes of predetermined dimensions nearest outer edges in spaced relation to horizontal and vertical edges of said vertical leg, c. said vertical leg having a plurality of connecting bolts of a predetermined length disposed nearest outer edges and spaced in relation to horizontal and vertical edges of said vertical leg, d. said vertical leg having a plurality of holes of a predetermined diameter interposed between said plurality of connecting bolts and disposed in spaced relation to said horizontal and vertical edges, e. said vertical leg having plurality of connecting bolt sleeves of a predetermined length, f. said vertical leg having a plurality of compression springs of a predetermined size, g. said grip further including a six sided rectangular pressure plate having a length substantially greater than the width with at least two flat planar surfaces over a majority of the length thereof, h. said six sided rectangular pressure plate being laterally spaced in a substantial coplanar position to a flat planar surface of said vertical leg whereby said six sided plate is laterally connected to said right angle vertical leg in a substantially coplanar position, i. said rectangular pressure plate having a plurality of connecting bolt holes of a predetermined diameter selectively positioned nearest outer edges in spaced relation to horizontal and end edges of said rectangular plate, j. said rectangular pressure plate having a plurality of pressure plate teeth access holes of a predetermined diameter interposed between connecting bolt holes in spaced relationship to horizontal and end edges of said rectangular plate, k. said rectangular plate having a plurality of adjusting washers of a predetermined size, l. said pressure plate having a plurality of teeth interposed between said plurality of connecting bolt holes in said pressure plate, m. said horizontal leg of said right angle formed member having a plurality of holes of predetermined sizes disposed in relation to horizontal and end edges of said horizontal leg, and n. said horizontal leg of said right angle formed member having a handle connected in a substantially coplanar position to the flat planar surface of said horizontal leg between horizontal end edges.

2. A grip as in claim 1 wherein a plurality of connecting bolts extending through said vertical leg perpendicular to the flat planar surface of said vertical leg are selectively spaced in relationship to the horizontal edge and end edges.

3. A grip as in claim one 1 wherein said plurality of connecting bolt sleeves are positioned over the plurality of connecting bolts thereby defining a slidable means for said six sided rectangular plate over said connecting bolt sleeves.

4. A grip as in claim 1 wherein said plurality of compression springs are sandwiched between the vertical leg exterior flat planar surface and the flat planar surface of six sided rectangular plate whereby a lateral coplanar separation is maintained between said exterior flat planar surface and said rectangular plate.

5. A grip as in claim 1 wherein said pressure plate comprising a means whereby space is provided for gripping said grip.

6. A grip as in claim 1 whereby said plurality of teeth are sharp pointed threaded screw type teeth of substantial dimensions extending through said pressure plate outwardly and perpendicular to the flat planar surface of the pressure plate and interposed between said vertical leg and said pressure plate and positioned perpendicular to said flat planar surface of the vertical leg.

7. A grip as in claim 1 wherein the plurality of adjusting washers are positioned over said plurality of teeth and sandwiched between the flat planar surface of the pressure plate and heads of the plurality of teeth defining a means for adjusting said depth of penetration of said teeth.

8. A grip as in claim 1 wherein a plurality of pressure plate teeth access holes are selectively located to define a means whereby said teeth can penetrate said vertical leg when urged towards said vertical leg.

9. A grip as in claim 1 whereby each of said plurality of teeth are forced into penetrating said plurality of pressure plate teeth access holes and further penetrating the flat wall of a box thereby defining means for a lifting position of said grip.

10. A grip as in claim 1 whereby said handle defining a means for controlling said grip.

* * * * *